Dec. 20, 1938.    W. STRAUSS    2,140,682
METHOD OF AND MEANS FOR CLOSING PISTON RINGS
Filed March 27, 1937
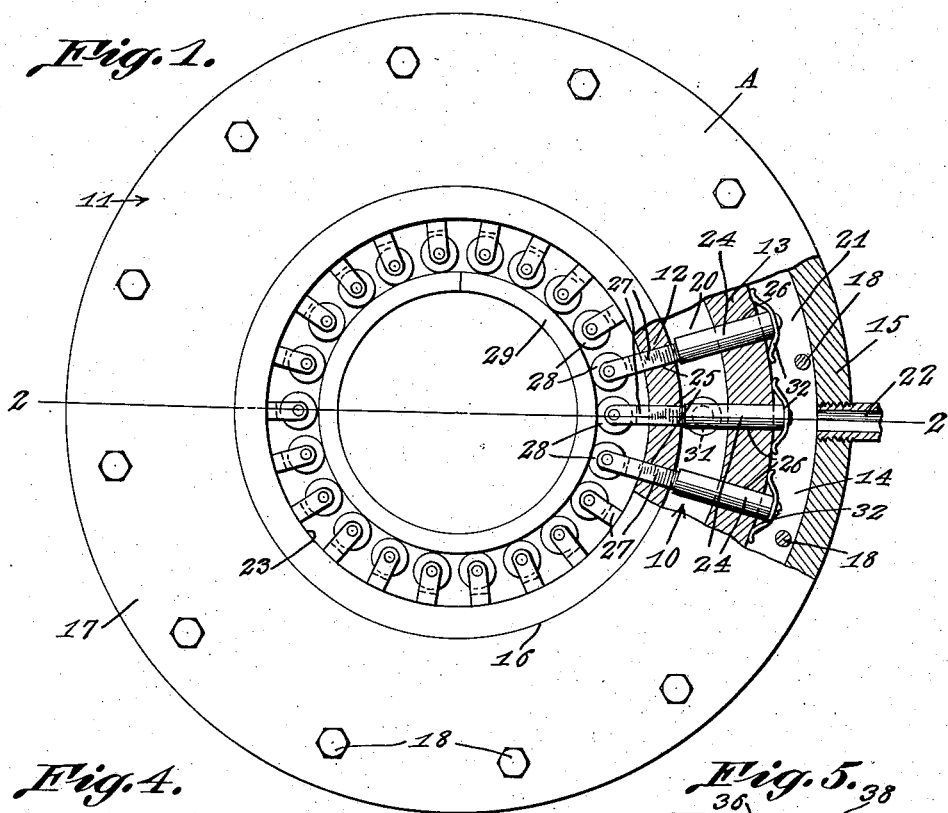
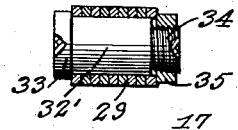
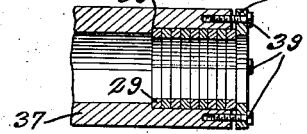
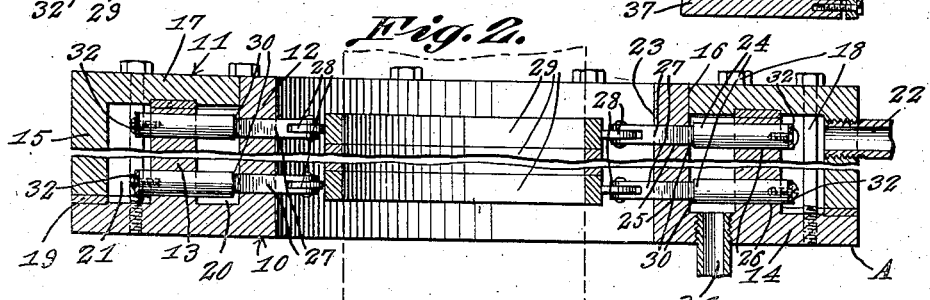
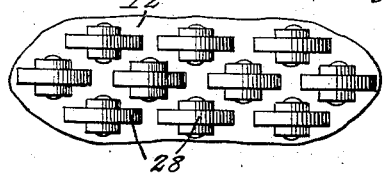
William Strauss, INVENTOR
BY Victor J. Evans & Co.
ATTORNEYS Patented Dec. 20, 1938

2,140,682

UNITED STATES PATENT OFFICE 2,140,682

METHOD OF AND MEANS FOR CLOSING PISTON RINGS

William Strauss, Philadelphia, Pa.

Application March 27, 1937, Serial No. 133,454

1 Claim. (Cl. 29—89)

The invention relates to a method of and means for closing piston rings.

The primary object of the invention is the provision of means of this character, wherein one or a number of piston rings may be acted upon through hydraulic pressure uniformly distributed throughout the external extent of such rings to close the same so that they may be machined both interiorly and exteriorly in a ready and convenient manner.

Another object of the invention is to provide a method of the handling of split rings such as piston rings so that these may be brought into a closed condition, the closing of the rings being had by a hydraulic pressure uniformly applied exteriorly to said rings, then holding these closed rings for the machining of the same both internally and externally with accuracy.

A further object of the invention is the provision of means of this character, wherein the construction is novel in its entirety, allowing the closing of piston rings and the shaping thereof into true circular form with dispatch and economy.

A still further object of the invention is the provision of means of this character, which is simple in its construction, thoroughly reliable and effective in operation, automatic in the working thereof, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a top plan view partly in section of the means constructed in accordance with the invention.

Figure 2 is a fragmentary sectional view taken on the line 2—2 of Figure 1.

Figure 3 is a fragmentary elevation showing the series of rollers for contact with piston rings.

Figure 4 is a side elevation partly in section of a mandrel for the holding of the closed piston rings after the shaping thereof.

Figure 5 is a fragmentary vertical longitudinal sectional view showing the closed piston rings held for internal machining of the same while in Figure 4 the rings are held for external machining.

Similar reference characters indicate corresponding parts throughout the several views in the drawing.

Referring to the drawing in detail, the means for the closing of piston rings constituting the present invention and employed in carrying out of the method of handling of said closed rings comprises a two-part chambered body or housing A, its parts being indicated at 10 and 11, respectively. These parts 10 and 11 are of circular formation and the part 10 is provided with the spaced inner and intermediate annular dividing walls 12 and 13, respectively, these rising from a flat bottom 14 while the part 11 is provided with an outer annular wall 15 and a central circular opening 16, the wall 15 being extended downwardly from the flat top area 17 of said part 11. These parts when assembled are held together by fasteners 18 in the form of bolts and the joints therebetween carry packings 19 to render the body or housing A leakproof.

The body or housing A by the walls 12, 13 and 15 creates interiorly thereof concentrically disposed inner and outer annular chambers or spaces 20 and 21, respectively, there being a fluid inlet lead 22 opening into the chamber or space 21 for the delivery thereinto of fluid under pressure from any suitable source of supply for a purpose presently described.

The annular wall 12 of the part 10 affords a center circular opening 23 through the body or housing A for the work to be operated upon, namely, piston rings of the split, open or gap type to be closed.

Within the body or housing A and radially arranged to the open center 23 therein are circular rows of closely arranged slidable plungers 24, these working through guide openings 25 and 26, respectively, formed in the walls 12 and 13 and the plungers of one row are staggered with relation to those in adjacent rows so that such plungers can be arranged in extremely close relation to each other in the respective rows. The guide openings 25 are preferably of squared formation for the fitting of the squared portions 27 of the plungers while the guide openings 26 are round and accommodate the correspondingly shaped remaining portions of said plungers. The squared portions 27 of the plungers prevent the turning of these during sliding movements. However, these plungers may be of circular formation externally thereof or otherwise shaped throughout their length.

The plungers 24 project into the open center 23 of the body or housing A and have journaled in their inner ends rollers 28 which are adapted for contact with piston rings 29 of the split or gap type to be closed through hydraulic pressure let into the chamber 21 and active upon the plungers 24 which become active under such pressure to have the rollers 28 contact and play against the rings 29 constituting the work operated upon thereby for the closing of the same.

The squared portions 27 of the plungers 24 provide stop shoulders 30 for coaction with the wall 12 of the part 10 of the body or housing A to limit the inward movement of these plungers when hydraulically operated. The purpose of the stop shoulders 30 on the plungers 24 is to limit the inward throw of said plungers to enable the work, such as piston rings, to be centered within the housing, this at the same time effecting equally applied pressure on the work with the result that the closed rings will exert after the machining thereof a uniformly distributed pressure against the cylinder wall of a motor and maintain the true circular formation thereto whereas the wear on such ring or rings will be distributed uniformly in the circular contour thereof.

The outer ends of the plungers 24 carry bowed leaf springs 32 which act against the wall 13 and function to retract these plungers 24 within the space or chamber 21 when hydraulic pressure is reduced therein.

When the piston rings 29 have been closed at the gaps therein, these are received in a group upon a mandrel 32' specially designed with a head 33 at one end and a reduced externally threaded opposite end 34 carrying a clamping nut 35 threaded upon the latter so that the piston rings 29 in the group upon this mandrel 32 may be externally machined in a lathe (not shown) or otherwise.

When it is required to internally machine the group of piston rings 29, the latter are held within a seat 36 internally of a hollow mandrel 37 and such rings retained in this seat 36 by a clamping ring 38 carried by said mandrel 37 and thus the said rings 29 may be conveniently internally machined.

The piston rings are preferably cast and are in substantially oval formation, then a portion of each ring is severed therefrom so that the ring when closed will have inherent resiliency or expansion, these rings thus formed and prior to the closing thereof are either singly or in group placed within the opening 23, being understood of course, that the housing is held upon a suitable support which allows the open rings to be held in a position to be acted upon through hydraulic pressure. In this condition one or a group of the rings after introduction into the center opening 23 in the body or housing A will be acted upon by the rollers 28 of the rows of plungers 24, these being operated through hydraulic pressure existing within the space or chamber 21, so that the said rings 29 will be acted upon for the closing thereof. When the rings through hydraulic pressure have been closed, the same are then in a condition for both external and internal machining. To enable the machining operation to be carried forth with dispatch and with accuracy, the closed rings are first placed upon the mandrel 32' and clamped thereon thus being held for external machining. After external machining these rings upon the mandrel 32' are inserted into the mandrel 37 to occupy the seat 36 therein whence such rings are released from the mandrel 32' and clamped by the clamping ring 38 whence such rings can be internally machined. In this manner the external and internal machining of the rings can be carried forth with dispatch and with accuracy. Thereafter, such rings are ready for the application to a piston of a motor and are in a shape to effect a uniform pressure throughout their extent against the inner wall of the piston cylinder for a uniformity of wear of such rings and inner wall of the cylinder in the use of said rings.

Leading from the space or chamber 20 is an exhaust pipe or conduit 31 which enables the escape of any fluid finding its way from the chamber or space 21 into the said chamber or space 20 during the operation of the apparatus as there might be a possibility of leakage at the plungers 24 through the openings 26 accommodating the same as provided in the wall 13 of the housing A.

What is claimed is:

A piston ring contracting means comprising a hollow body having a tubular cylindrical inner wall opening through opposite ends of the body, a cylindrical guide wall disposed concentrically about said first wall and within said body, a plurality of radially arranged plungers slidably engaging through said guide wall, means integral with said plungers slidably engaging through said first cylindrical wall holding said plungers against turning, rollers carried by said means interiorly of said first wall, said rollers having the axes thereof disposed parallel to the axis of said first wall, a bowed spring engaging across the outer end of each plunger with the ends of each spring engaging against the adjacent surface of said guide wall, and means securing the central portion of a spring to a plunger whereby to constantly urge said plungers radially outwardly, said body having means to admit fluid under pressure to thereby move said rollers to ring contracting position.

WILLIAM STRAUSS.